United States Patent
Husain et al.

(10) Patent No.: US 12,085,266 B1
(45) Date of Patent: Sep. 10, 2024

(54) LAMP INCLUDING AN ALGAE-INFUSED MICROBIAL FUEL CELL

(71) Applicant: KING FAISAL UNIVERSITY, Hofouf (SA)

(72) Inventors: Arbab Husain, Aligarh (IN); Afreen Khanam, Aligarh (IN); Ghayyum Husain, Aligarh (IN); Mohammad Aatif, Al-Ahsa (SA); Mohd Farhan, Al-Ahsa (SA); Ghazala Muteeb, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/435,522

(22) Filed: Feb. 7, 2024

(51) Int. Cl.
*F21V 23/02* (2006.01)
*H01M 8/16* (2006.01)
*F21Y 115/10* (2016.01)

(52) U.S. Cl.
CPC ............... *F21V 23/02* (2013.01); *H01M 8/16* (2013.01); *F21Y 2115/10* (2016.08)

(58) Field of Classification Search
CPC .......... F21V 23/02; F21V 99/00; F21V 15/00; F21V 15/01; H01M 8/16; H01M 8/00; F21Y 2115/10; F21L 4/00; F21L 4/02; F21L 4/027
See application file for complete search history.

(56) References Cited

U.S. PATENT DOCUMENTS

| | | | | |
|---|---|---|---|---|
| 10,090,113 | B2 * | 10/2018 | Stein | H10K 85/761 |
| 2007/0297167 | A1 * | 12/2007 | Greenhoe | F21L 4/08 |
| | | | | 362/183 |
| 2022/0320559 | A1 * | 10/2022 | Packirisamy | H01M 8/16 |
| 2022/0388879 | A1 * | 12/2022 | Stein | C02F 3/005 |
| 2024/0079624 | A1 * | 3/2024 | Cevik | H01M 4/96 |

FOREIGN PATENT DOCUMENTS

| | | |
|---|---|---|
| CN | 201877517 U | 6/2011 |
| CN | 101719555 B | 12/2011 |
| CN | 105702993 A | 6/2016 |

OTHER PUBLICATIONS

Krishna Kumar Jaiswal et al. "Microalgae fuel cell for wastewater treatment: Recent advances and challenges" DOI: 10.1016/j.jwpe.2020.101549.
Ming Li et al. "Carbon dioxide sequestration accompanied by bioenergy generation using a bubbling-type photosynthetic algae microbial fuel cell" DOI: 10.1016/j.biortech.2019.02.038.
Nethraa Kannan et al. "Algae-assisted microbial fuel cells: A practical overview" DOI: 10.1016/j.biteb.2021.100747.

* cited by examiner

*Primary Examiner* — Bao Q Truong
(74) *Attorney, Agent, or Firm* — Nath, Goldberg & Meyer; Joshua B. Goldberg

(57) ABSTRACT

A lamp with algae-infused microbial fuel cell includes a housing having light emitting diode (LED) bulbs along a surface of the housing and microbial fuel cell inside the housing. The microbial fuel cell can include a cathode chamber having a cathode and algae, an anode chamber having an anode and electroactive bacteria, and a separator separating the cathode chamber and the anode chamber. In an embodiment, the LED bulbs are connected to the cathode.

5 Claims, 2 Drawing Sheets

LAMP INCLUDING AN ALGAE-INFUSED MICROBIAL FUEL CELL

BACKGROUND

1. Field

The present subject matter relates to an electrical device powered by electrical energy produced from biochemical reactions, and particularly to an eco-friendly lamp including an algae-infused microbial fuel cell.

2. Description of the Related Art

Microbial fuel cells are devices that utilize biochemical reactions from microorganisms to produce electrical energy. Microbial fuel cells operate on a principle of redox reactions, whereby microorganisms oxidize organic fuel to generate products such as electrons that are used to generate electrical energy. Among bio-electricity production technologies, microbial fuel cells have the highest energy conversion efficiency and standard free energy. Due to their advantages and potential, microbial fuel cells have been gaining interest as a source for renewable and clean energy production. Therefore, various devices have been developed to assist and optimize the production of electrical energy using microbial fuel cells.

Although many devices have been developed to optimize the production of electrical energy using microbial fuel cells, most of the devices heavily rely on hardware design aspects of the microbial fuel cells. As such, these devices present certain limitations, especially during the process of scaling up the microbial fuel cells for practical applications. In addition to that, some design aspects require complex mathematical modelling that is difficult to comprehend and requires a relatively long computational time.

Thus, a lamp with algae-infused microbial fuel cell solving the aforementioned problems is desired.

SUMMARY

The present subject matter relates to a lamp with an algae-infused microbial fuel cell. The lamp with the algae-infused microbial fuel cell can include a housing and an algae-infused microbial fuel cell disposed inside the housing. The housing can support light emitting diode (LED) bulbs along a surface thereof. The LED bulbs can emit light as a result of the energy derived from the microbial fuel cell, providing sustainable and eco-friendly illumination.

According to an embodiment, a lamp with algae-infused microbial fuel cell includes a housing having light emitting diode (LED) bulbs along a surface of the housing and microbial fuel cell inside the housing. The microbial fuel cell can include a cathode chamber having a cathode and algae, an anode chamber having an anode and electroactive bacteria, and a separator separating the cathode chamber and the anode chamber. In an embodiment, the LED bulbs are connected to the cathode.

An embodiment of the present teachings relates to a microbial fuel cell having a cathode chamber including a cathode and algae; an anode chamber including an anode and electroactive bacteria, and a separator separating the cathode chamber and the anode chamber.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
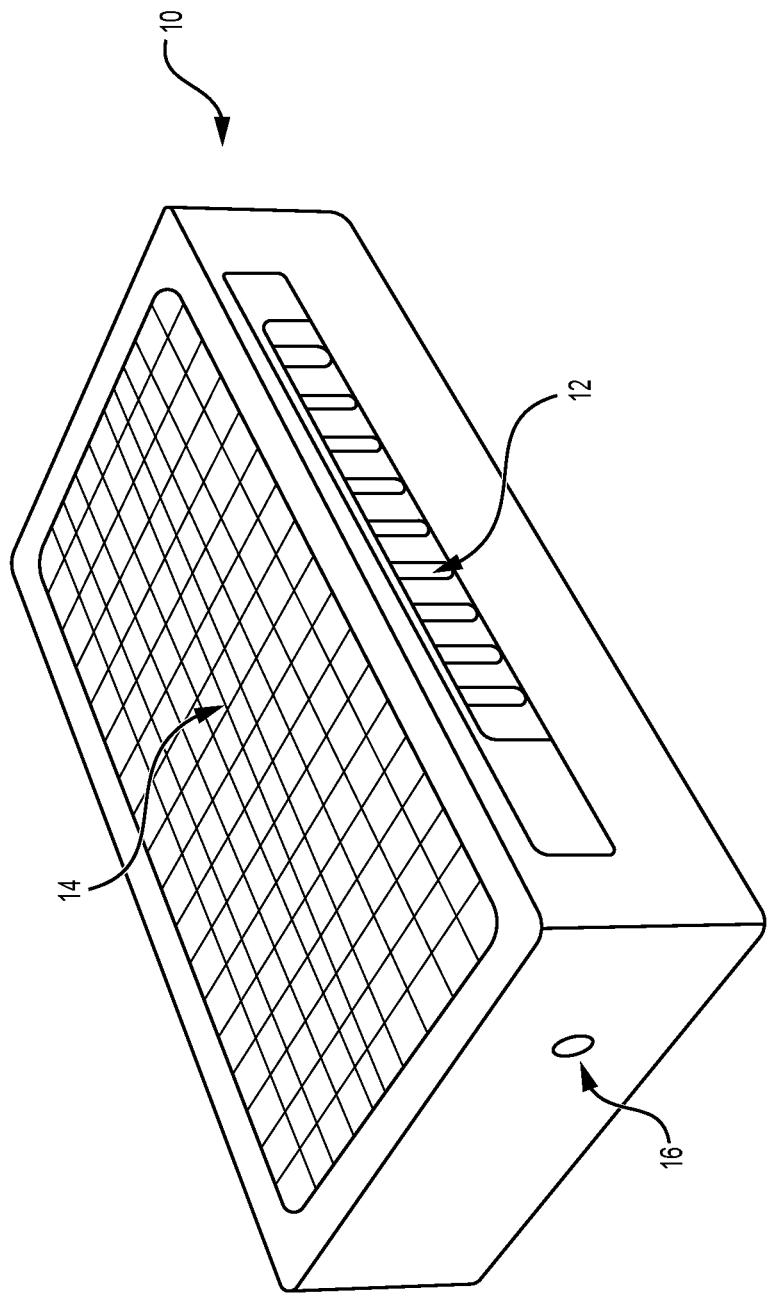
FIG. 1 is a perspective view of one embodiment of the lamp with algae-infused microbial fuel cell according to the present teachings.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

An embodiment of the present subject matter relates to a lamp including an algae-infused microbial fuel cell, designated 10 in the drawings. As shown in FIG. 1, lamp 10 can include a housing 12 which supports light emitting diode (LED) bulbs 32 at an upper surface thereof and a microbial fuel cell 14 inside the housing. The lamp including an algae-infused microbial fuel cell 10 can be powered on and off by power switch 16. When the lamp 10 is powered on, the LED bulbs 32 can emit light from the energy derived from the microbial fuel cell 14, providing sustainable and eco-friendly illumination.

Figure 2:
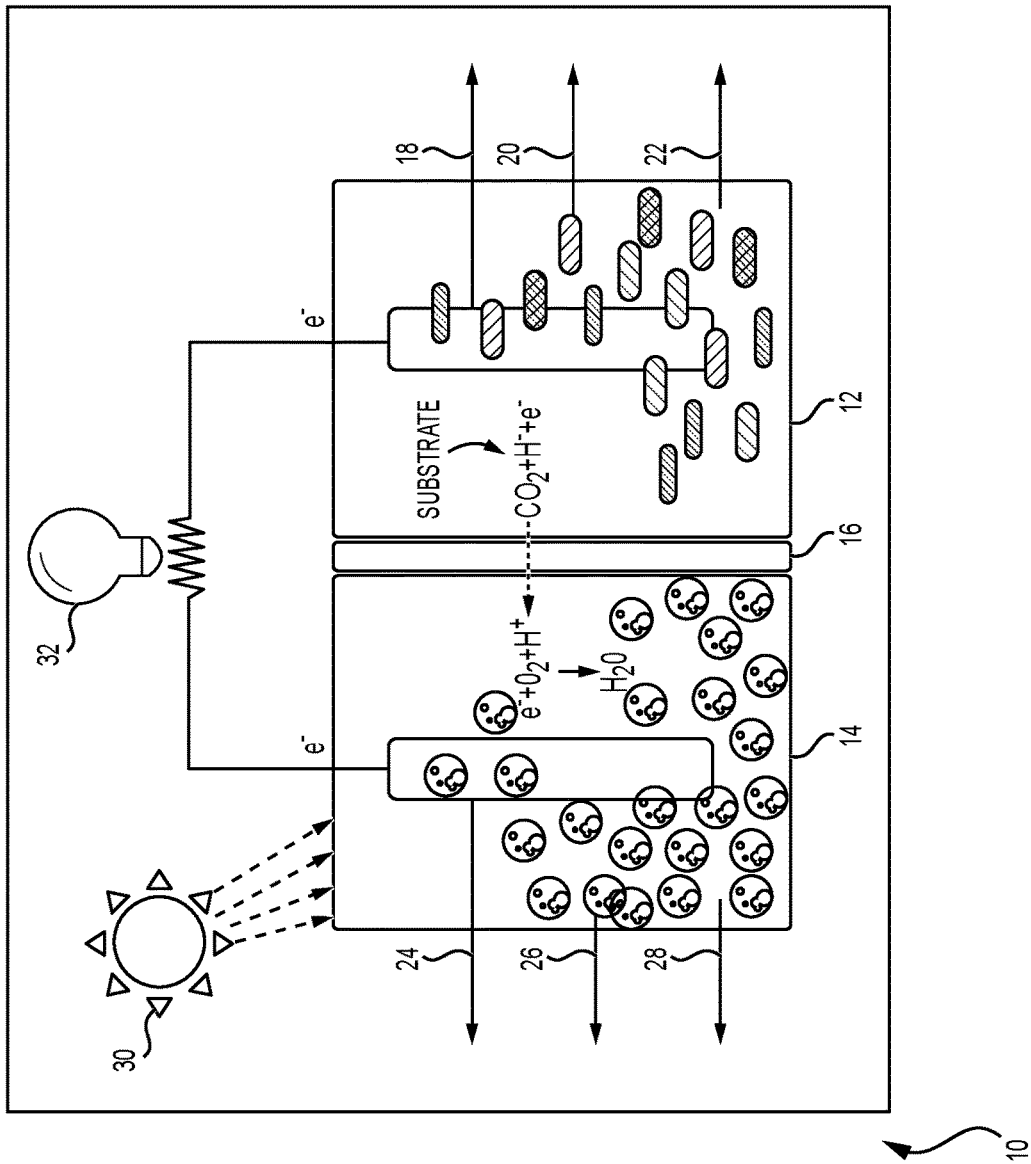
FIG. 2 is a schematic diagram of the microbial fuel cell according to the present teachings.

According to an embodiment, the lamp with algae-infused microbial fuel cell 10 is powered by the microbial cell 14 inside the housing 12. Housing 12 can include a cathode chamber 28 and an anode chamber 22, as shown in FIG. 2. The cathode chamber 28 and the anode chamber 22 are separated by an ion-permeable separator 16. Cathode chamber 28 includes a cathode 24 and algae 26. The anode chamber 22 includes an anode 18 and electroactive bacteria 20. The LED bulbs 32 are connected to the cathode 24.

According to an embodiment, the anode 18 is placed within the anode chamber 22 with the electroactive bacteria 20. Electroactive bacteria 20 can consume the organic materials produced by algae 26 from the neighbouring cathode chamber 28 and initiate oxidation reactions to take place at the anode 18. Electrons are released during these reactions, starting the flow of electrical current from the anode chamber 22 to the cathode chamber 28.

According to an embodiment, at least one surface, e.g., a top surface, of the housing 12 can be configured to allow sunlight to pass therethrough to the cathode chamber 28. For example, at least one surface of the housing 12 can be transparent.

The cathode chamber 28 can include algae 26, which can be the primary fuel source for the microbial fuel cell 14. The cathode chamber 28 is configured to facilitate the growth of algae 26 as well as allow photosynthesis to occur. In an embodiment, the cathode chamber 28 can provide an optimal environment for photosynthesis, including sufficient exposure to light from the sun 30.

The cathode 24 is physically separated from the electroactive bacteria 20 in the anode chamber 22 by the separator 16. The separator 16 allows the movement of ions between the chambers 22, 28. Reduction reactions occur at the cathode 24, typically involving reaction with oxygen. Electrons flow from the anode chamber 22 to the cathode chamber 28 through the separator 16, completing the electrical circuit.

According to an embodiment, the anode chamber 22 houses electroactive bacteria 20 and an anode 18. These bacteria 20 have the unique ability to transfer electrons during their metabolic processes. In this context, they play a crucial role in the generation of electricity by consuming the organic materials produced by the algae 26 in the neighbouring chamber 28. Thus, algae 26 and electroactive bacteria 20 engage in a symbiotic relationship. Algae, through photosynthesis, produce organic materials and oxygen. Electroactive bacteria consume the organic materials in the anode chamber, forming a mutually beneficial interaction.

As described above, electroactive bacteria in the anode chamber metabolizes the organic materials obtained from algae. According to an embodiment, this metabolic process in the anode chamber results in the release of electrons as a byproduct. Electrons released during the metabolic processes of electroactive bacteria can flow from the anode through an external circuit to the cathode. This electron flow can generate an electric current. At the cathode, electrons can combine with oxygen in reduction reactions. This can result in the formation of water or other byproducts, contributing to the overall sustainability of the system.

According to an embodiment, the generated electric current in the cathode chamber can be harnessed to power the LED bulbs. The LED bulbs can be connected to the cathode. The LED bulbs cn emit light as a result of the energy derived from the microbial fuel cells, providing sustainable and eco-friendly illumination.

The lamp with algae-infused microbial fuel cell 10 can be configured in various forms and sizes, making it suitable for both household and commercial use. It can be integrated into existing lighting systems or operate independently. The lamp including an algae-infused microbial fuel cell requires minimal maintenance, primarily involving nutrient replenishment for algae and periodic cleaning. The lamp provides a sustainable lighting solution which can function in rural and off-grid areas, where access to conventional energy sources may be limited.

An embodiment of the present teachings relates to a microbial fuel cell having a cathode chamber including a cathode and algae; an anode chamber including an anode and electroactive bacteria, and a separator separating the cathode chamber and the anode chamber. The use of algae as a primary fuel source in the microbial fuel cell and the symbiotic relationship of the algae with electroactive bacteria creates an environmentally friendly energy generation system. Importantly, the algae's photosynthetic activity not only produces organic materials but also captures carbon dioxide from the environment. This carbon capture contributes to the reduction of greenhouse gas emissions, aligning with environmental sustainability goals. Additionally, algae is abundant and easy to cultivate, requiring minimal resources for growth. Algae's photosynthetic carbon capture contributes to lowering greenhouse gas emissions, making the lighting system environmentally conscious.

It is to be understood that the lamp with algae-infused microbial fuel cell is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A lamp with an algae-infused microbial fuel cell, comprising:
    a housing having light emitting diode (LED) bulbs along a surface thereof; and
    a microbial fuel cell inside the housing, the microbial fuel cell having
        a cathode chamber including a cathode connected to the light emitting diode (LED) bulbs and algae,
        an anode chamber including an anode and electroactive bacteria; and
        a separator separating the cathode chamber and the anode chamber.

2. The lamp with algae-infused microbial fuel cell of claim 1, wherein a surface of the housing is transparent.

3. The lamp with algae-infused microbial fuel cell of claim 1, wherein a top surface of the housing is transparent.

4. The lamp with algae-infused microbial fuel cell of claim 1, wherein the separator is an ion-permeable separator.

5. A microbial fuel cell having a cathode chamber including a cathode and algae; an anode chamber including an anode and electroactive bacteria, and a separator separating the cathode chamber and the anode chamber.

* * * * *